United States Patent [19]

Edwards

[11] Patent Number: 5,538,526
[45] Date of Patent: Jul. 23, 1996

[54] RECYCLE OF GLASS FURNACE WASTE MATERIALS

[75] Inventor: George H. Edwards, Elmira, N.Y.

[73] Assignee: Corning Incorporated, Corning, N.Y.

[21] Appl. No.: 348,541

[22] Filed: Dec. 1, 1994

Related U.S. Application Data

[63] Continuation-in-part of Ser. No. 46,660, Apr. 12, 1993, abandoned.

[51] Int. Cl.$^6$ ........................................... C03B 3/02
[52] U.S. Cl. ........................... 65/262; 65/21.5; 65/134.8; 65/27; 501/155; 588/252
[58] Field of Search ................................ 65/21.1, 21.2, 65/21.5, 134.8, 27; 501/155, 29, 32; 588/252

[56] References Cited

U.S. PATENT DOCUMENTS

| | | | |
|---|---|---|---|
| 3,847,568 | 11/1974 | Cihon | 51/295 |
| 4,350,512 | 9/1982 | Krumwiede | 65/27 |
| 4,666,490 | 5/1987 | Drake | 65/134.8 |
| 5,273,566 | 12/1993 | Balcar | 65/17 |
| 5,304,701 | 4/1994 | Igarashi | 65/134.8 |
| 5,340,372 | 8/1994 | Macedo | 65/21.2 |

OTHER PUBLICATIONS

Tooley, Handbook of Glass Manuafacture, Apr. 1953, pp. 57–67.

Primary Examiner—John Hoffmann
Attorney, Agent, or Firm—Robert L. Carlson

[57] ABSTRACT

A novel glass batch material produced from materials comprising refractory brick and one or more fluxes and an associated method, and a method of making glass utilizing the novel glass batch material. The present invention provides a method of safely and inexpensively disposing of and utilizing used refractory linings from glass melting furnaces.

8 Claims, 1 Drawing Sheet

5,538,526

RECYCLE OF GLASS FURNACE WASTE MATERIALS

This application is a Continuation-in-Part of U.S. patent application Ser. No. 08/046,660, filed Apr. 12, 1993, titled RECYCLE OF GLASS FURNACE WASTE MATERIAL, abandoned.

FIELD OF THE INVENTION

This invention relates to a recycling method and apparatus for converting refractory lining material from a glass furnace into a glass batch material.

BACKGROUND OF THE INVENTION

A glass melting furnace typically comprises a steel shell with a lining of refractory bricks. A high volume glass furnace, such as a furnace designed to make bottles, television panels or windows, can be quite large and require 1 or 2 thousand tons of refractory bricks for its lining. These refractory bricks are chemically and physically stable while in contact with molten glass at high temperatures. That is, to provide extended furnace life and to preserve the targeted glass composition, the refractories should not react with or dissolve in the molten glass nor should they melt, crack, spall or deform at molten glass temperature.

The most common refractory bricks have, as their main constituent, an oxide of silicon, aluminum, zirconium or chromium. Furnace linings of silica brick, alumina firebrick or zirconia brick are suitable for most glass compositions. Zirconia refractories may be used in furnaces making glasses having a higher softening temperature.

A furnace carefully constructed of properly manufactured refractories has a typical life of 3 to 6 years. Corrosion, erosion and mechanical failure due to thermal shock eventually wear out the refractory lining. At the end of the useful life of the lining, the furnace is shut down, the used lining removed and a new lining installed.

Disposing of the used lining presents several problems. The mass of material is large, averaging 1000 to 2000 tons per year for a factory operating 2 or 3 high volume glass furnaces. The amount of available landfill space makes such disposal a concern. Also, the increasingly expensive cost of landfill disposal makes this an expensive component of operating a glass furnace.

Furthermore, having been a container for molten glass, the used refractory material typically contains particles of the glass and chemicals from the glass. Lead glasses and glasses which use arsenic as a refining agent constitute hazardous waste and must therefore be treated and disposed of in a special manner. This adds the concerns of environmental impact and liability, as well as an even more expensive disposal cost, to glass furnace operation.

Therefore, a need exists for a method of safely and inexpensively disposing of or utilizing used refractory linings from glass melting furnaces.

SUMMARY OF THE INVENTION

The present invention satisfies the above described need. The present invention provides a method for recycling used refractory lining from a glass melting furnace by utilizing it in a glass melt. The glass melt can then be used to make a consumer glass product. Recycling the used refractories as a glass furnace batch material is counterintuitive, since refractories by definition do not readily dissolve in or react with glass compositions. In fact, refractory inclusions in finished glass are regarded as defects. However, the present invention overcomes the difficulties presented by the seeming incompatibility of the refractory material and the molten glass.

The present invention provides a method of producing a glass batch material, the method comprising the steps of crushing refractory brick; mixing the crushed refractory brick with one or more selected fluxes; forming a glass from the mixture; and reducing the glass to a particulate glass batch material. This glass batch material may then be melted in a conventional glass melt and used to form a consumer glass product.

A preferred embodiment of the present method of producing a glass batch material comprises mixing furnace dust with the crushed refractory brick and one or more selected fluxes.

Unwanted materials may be separated from the crushed refractory brick by means known to those skilled-in-the-art. For example, one embodiment of the present method of producing a glass batch material comprises magnetically removing metallic grains from the crushed refractory brick.

The present invention also provides a novel glass batch material formed from materials comprising refractory brick and one or more selected fluxes. A preferred embodiment of the present glass batch material is formed from materials comprising furnace dust. In one embodiment of the present glass batch material, the refractory brick used is substantially free of unwanted materials, such as, for example, metallic grains.

Furthermore, the present invention provides a method of making glass which includes utilizing glass batch material formed from materials comprising refractory brick and one or more selected fluxes. In a preferred embodiment of the present method of making glass, the materials further comprise furnace dust. In one embodiment of the present method of making glass the refractory brick is substantially free of metallic grains.

DETAILED DESCRIPTION OF THE INVENTION

Figure 1:
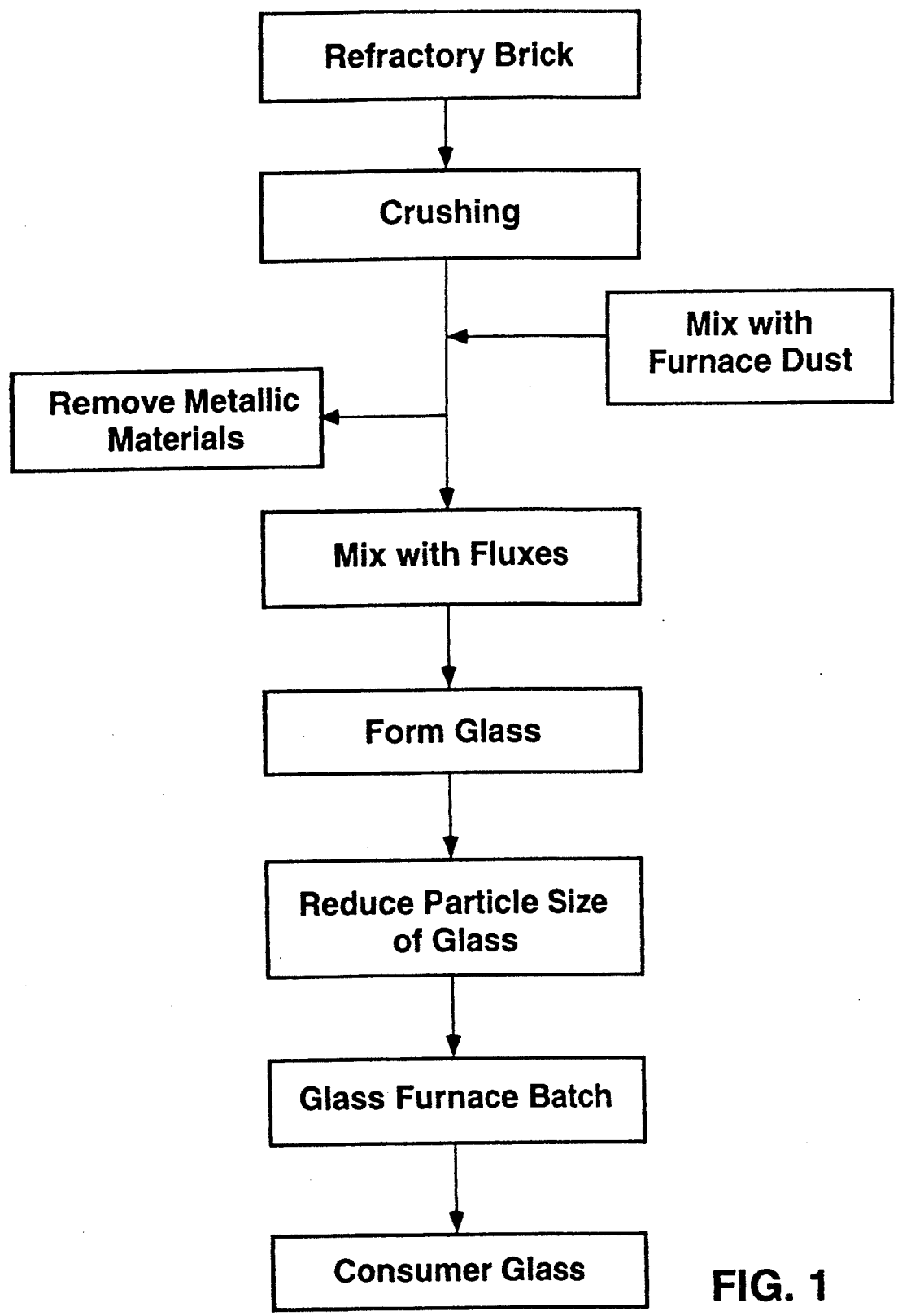
FIG. 1 is a flow chart illustrating a method in accordance with the present invention.

The present invention provides for a substantially closed loop glass-making process where substantially all process output is either formed into useful products or recycled back into the glass making process. Although the present invention is preferably practiced with used refractory brick from a glass melting furnace, the invention is equally applicable to unused refractory. Furthermore, used refractory from a non-glass making process may be utilized as long as the refractory and any entrained materials are rendered substantially chemically-compatible with the present process.

The refractory brick used in the present invention may be any refractory which is compatible with the glass melt into which the end glass batch material is to be placed. Examples of the refractory brick which may be used in the present invention include, but are not limited to, alumina firebrick, zirconia brick and silica brick. It is preferred that the chemicals in the refractory material are among the chemicals which make up the final glass product. For example, if the end glass batch material is to be placed into a glass melt which comprises a large amount of aluminum, the refractory used to make the end glass batch material would preferably be alumina brick.

Although refractories are typically made in the form of bricks, it will be appreciated the present invention as recited in the claims encompasses use of refractory material in any form.

FIG. 1 illustrates a method in accordance with the present invention. In accordance with the present invention, a glass batch material is produced by crushing the refractory brick material, mixing the crushed refractory brick material with one or more fluxes, forming a glass from the resultant mixture, and then transforming the glass into a particulate glass batch material. The resultant particulate glass batch material can be utilized (i.e., melted) in a glass melt, such as is utilized to produce consumer glass products.

Refractory brick materials, as used herein, means such materials as are commonly utilized for refractory brick in glass melting furnaces can be utilized in the present invention. Examples of such materials include alumina, zirconia, and silica refractory materials. Consumer glass product, as used herein, means products such as are commonly sold to ordinary household consumers, such as, for example, glass for television tubes, bowls, cups, drinking glasses, optical glasses, flat glass windows, windows for automobiles. The definition of consumer glass product, as used herein, does not include products which are not typically purchased by ordinary household consumers, such as, for example, land fill products, which are typically produced and paid for by corporate entities.

The methods of the present invention can be used to recycle glass furnace materials, such as refractory brick materials, back into a conventional glass melt and used to make a consumer glass product from the melted glass. The present invention can be utilized to make a single phase, homogeneous glass composition exhibiting performance characteristics which are suitable for the normal applications of such consumer glass products. The method is especially preferred for recycling furnace materials, employed in furnaces used to make television glass, back into television glass products, such as, for example, television panel glass.

In the present method of producing glass batch material, refractory brick is reduced to particulate form. This may be accomplished by any available method, such as, for example, crushing the brick. Refractory particles of an optimal size are preferably selected. The selected particulate refractory is preferably between about U.S. Standard 18 to 100 mesh, and most preferably about U.S. Standard 20 mesh. The desired particulate size can be selected by, for example, running the particles through one or more screens.

The particulate refractory may then be processed to remove unwanted materials. For example, in one embodiment of the present invention, unwanted metallic grains are removed from the particulate refractory with a magnet. Another example would be gravity separation of glass pieces.

The particulate refractory material is then mixed with one or more fluxes. Fluxes are reagents used in glass melting to lower the melting point of a glass batch. The fluxes used in the present invention should be compatible with the glass into which the end batch material is to be placed. For example, if the glass batch material made from the particulate refractory is to be placed in a glass melt which is using dolomite and limestone as fluxes, the particulate refractory is preferably mixed with dolomite and limestone. Examples of fluxes which may be used in the present invention include, but are not limited to, limestone, dolomite and soda ash.

Other compatible materials may be mixed with the particulate refractory and one or more fluxes. For example, in the batching and melting process, a glass furnace generates a considerable amount of airborne particulate (herein referred to as furnace dust), which is usually removed from the furnace exhaust stream by pollution control systems, such as, for example, bag houses or electrostatic precipitators. For certain glass compositions, this dust is a hazardous waste and thus adds the extra cost of disposal. Furnace dust collected by pollution control systems is often returned to the molten glass in the furnace. In a preferred embodiment of the present invention, furnace dust from a particular type of furnace is mixed with the particulate refractory, from that type of furnace, as well as one or more fluxes.

As with the fluxes used, the furnace dust should be substantially compatible with the glass into which the end glass batch material is to be placed. A most preferred scenario would be for the dust to come from the same furnace, or same type of furnace, into which the end glass batch material is to be placed.

The final mixture of particulate refractory, one or more fluxes and optional additional materials is then formed into a glass. The forming step simply involves bringing the mixture to a temperature high enough for a period long enough to form a glass. This step may be performed in a crucible, furnace or other container well known to those skilled-in-the-art.

The glass obtained is then reduced to a particulate glass batch material. This step is easily performed by methods well known to those skilled-in-the-art, such as, for example, casting and crushing the melted mixture, or shock cooling the melted mixture. Particulate glass batch material such as the material formed in the present invention is often referred to as a frit.

The glass batch material particles of a desired size are preferably selected. The selected glass batch material particles are preferably about U.S. Standard Mesh 10. Again, selection of a preferred particle size may be accomplished through methods well known to those skilled-in-the-art, such as, or example, running the material through screens.

The glass batch material is then utilized in making glass for consumer glass products. The glass batch material is placed into a glass melt, which is compatible as defined above, and melted along with the other materials in the glass melt to provide an acceptable final glass which is suitable for consumer glass products, despite the teachings of the prior art.

The present glass batch material may be utilized at any point in the glass making process. For example, the present glass batch material may be placed in the initial batch at the beginning of a melt or into the molten glass after startup. The amount of the present glass batch material which is preferably added to a glass melt depends on the size of the melt, the chemical makeup of the melt and the glass batch material, and the desired purity of the final glass.

The following examples will serve to illustrate specific embodiments of the invention. Nothing in these examples is meant to limit the scope of the invention.

EXAMPLE 1

A glass batch material was prepared using 42% beneficiated used Grefco silica brick, 49% furnace dust from a glass furnace which produces television panels, and 8.8% dolomite as a flux. The Grefco refractory is about 95% silica, 1% alumina and 2.8% calcium oxide.

The Grefco refractory brick was crushed using first a 6" Sturtevant jaw crusher and then a W. J. Fitzpatrick hammermill. The crushed material was sized by passing it over a U.S. Standard 20 mesh screen. Metal particles were removed from this −20 mesh refractory material by passing it through a dry, vibrating magnetic filter having a 4" bore, manufactured by Erie Magnetics of Erie, Pa.

This beneficiated refractory was then placed in a crucible melter of about 500 ml capacity, along with the furnace dust and flux as mentioned above. An intermittent batch and melt procedure was used, wherein a part of the total batch weight was added and allowed to reach fusion temperature before adding more batch. The number of steps in the intermittent batch melt cycle depends upon the fraction of volatiles in the batch and the total batch weight. After the last batch addition, the molten material was held in the crucible for 3–4 hours. At the end of the melt time, the molten material was poured back and forth between two crucibles 3 or 4 times to fully mix the molten material and to remove as much of the volatile material as possible.

The mixture was then cast in 6"×6" shallow trays (depth about 1"). The resulting solid slabs were found to be a gray, opal, single phase glass. The glass slabs where hammered and ground with a steel mortar and pestle to pass through a U.S. Standard 10 mesh screen to make the glass batch material.

A test melt was made using a standard batch for television panels, except the batch calculation was adjusted to include 3.3 weight % of the glass batch material described above.

The resulting glass had a chemical composition which met all specifications for television glass panels for color and clarity, thus indicating that the glass could be formed into a consumer glass product, in this case a glass television panel.

EXAMPLE 2

In a second trial, a glass batch material was prepared, using the procedure of Example 1 and using 51.6% dust, 22.3% beneficiated Grefco brick, 8.3% KX-99 beneficiated brick (52% silica, 43.5% alumina and 1.5% iron oxide), 16.5% dolomite, and 1% Keystone sand. Again a single phase, opal glass batch material was produced.

A test melt was made, as in example 1, with the batch calculation adjusted to include 2.4 weight % of the glass batch material described above.

The glass from the test melt met chemistry, clarity and color specifications for TV panel glass typically made on that same furnace.

Cost calculations indicate that, for non-hazardous materials, recycling refractory using the present invention produces a small savings over the alternative of disposing of the waste by-products. For hazardous materials, recycling refractory with the present invention provides an appreciable savings over the disposal alternatives. Of course, these savings do not reflect the cost associated with deleterious environmental impact and liability.

To realize the full cost benefits of the present invention, the present method of producing a glass batch material using refractory material could be performed by one or more mobile apparatus. Even in a factory operating 3 or 4 glass furnaces, a permanent unit for making the glass batch material of the present invention would not be fully utilized. Capital investment would be reduced and equipment efficiency improved with a unit which was mobile and, therefore, able to serve a number of glass furnace sites.

The furnace requirements for frit making are not restrictive. Rapid melting under nominal control conditions are adequate to produce frit. Stirred furnaces or cyclone furnaces are examples of fast melting units which can make acceptable glass batch material. Furthermore, the glass batch material of the present invention is contemplated as being placed back into a glass melt, although it need not necessarily be used in this way. An alternative approach is to make some parts of the equipment mobile with other parts permanently installed at each furnace site.

It will be appreciated that a novel glass batch material produced from materials comprising refractory brick and one or more fluxes and an associated method, and a method of making glass utilizing the novel glass batch material have been disclosed. Although the present invention has been shown and described with respect to detailed embodiments thereof, it will be understood by those skilled-in-the-art that various changes in the form and detail thereof may be made without departing from the spirit and scope of the present invention.

What is claimed is:

1. A method of producing a glass batch material, the method comprising the steps of crushing refractory brick which has previously been employed in a glass melting operation, to thereby form a crushed refractory brick, mixing the crushed refractory brick with one or more fluxes to form a mixture, forming a glass from the mixture;

transforming the glass into a particulate glass batch material; and melting the particulate glass batch material in a glass melt to form a molten glass.

2. The method of claim 1, wherein said transforming step comprises shock cooling the glass.

3. The method of claim 1, wherein said transforming step comprises crushing the glass.

4. The method of claim 1, wherein said mixing step further comprises:

mixing furnace dust with said crushed refractory brick and said fluxes.

5. The method of claim 1, wherein the crushed refractory brick in said mixing step is selected from the group consisting of alumina firebrick, zirconia brick and silica brick.

6. The method of claim 1, wherein the one or more fluxes are selected from the group consisting of limestone, dolomite and soda ash.

7. The method of claim 1, further comprising forming a consumer glass product from said molten glass, and said consumer product is selected from the group consisting of television tubes, bowls, cups, drinking glasses, optical glasses, flat glass windows, windows for automobiles, television panels, and bottles.

8. The method of claim 7, wherein said forming a consumer glass product step comprises forming a single phase glass.

* * * * *